(12) United States Patent
Chang et al.

(10) Patent No.: US 7,627,308 B2
(45) Date of Patent: Dec. 1, 2009

(54) MOBILE COMMUNICATION SYSTEM, MOBILE COMMUNICATION DEVICE AND METHOD FOR INCOMING-CALL FILTERING

(75) Inventors: Yan-Cheng Chang, Beidou Town (TW); Ching Yu Lin, Hsinchu (TW)

(73) Assignee: Qisda Corporation, Taoyuan County (TW)

( * ) Notice: Subject to any disclaimer, the term of this patent is extended or adjusted under 35 U.S.C. 154(b) by 515 days.

(21) Appl. No.: 11/409,859

(22) Filed: Apr. 24, 2006

(65) Prior Publication Data
US 2006/0240810 A1 Oct. 26, 2006

(30) Foreign Application Priority Data
Apr. 22, 2005 (TW) .............................. 94112853 A

(51) Int. Cl.
*H04M 3/42* (2006.01)

(52) U.S. Cl. .................... 455/414.1; 455/417; 455/421; 455/561; 455/434; 455/522

(58) Field of Classification Search ............. 455/414.1, 455/417, 421, 426, 434, 456, 561, 522; 379/57, 379/59
See application file for complete search history.

(56) References Cited

U.S. PATENT DOCUMENTS

| 6,035,193 A * | 3/2000 | Buhrmann et al. | ........ 455/426.1 |
| 6,735,432 B1 * | 5/2004 | Jarett et al. | ................. 455/417 |
| 6,823,196 B1 * | 11/2004 | Itoh et al. | ................. 455/553.1 |
| 2004/0097259 A1 * | 5/2004 | Toor et al. | ................. 455/552.1 |

FOREIGN PATENT DOCUMENTS

| CN | 1427639 | 7/2003 |
| CN | 1558651 | 12/2004 |
| CN | 1581904 | 2/2005 |

* cited by examiner

*Primary Examiner*—Sanh D Phu

(57) ABSTRACT

A mobile communication system, a mobile communication device, and a method for incoming-call filtering are provided. The mobile communication device includes a wide area communication module and a local area communication module that are selectively enabled. A server includes a plurality of data groups and at least one response function. As the server receives an incoming call through a wide area communication network asking for communication with the communication device, the server compares a data of the incoming call with the plurality of data groups and then performs one response function based on the result of comparison.

20 Claims, 4 Drawing Sheets

MOBILE COMMUNICATION SYSTEM, MOBILE COMMUNICATION DEVICE AND METHOD FOR INCOMING-CALL FILTERING

CROSS-REFERENCE TO RELATED APPLICATIONS

This application claims the right of priority of Taiwan Patent Application No. 094112853 entitled "Mobile Communication System, Mobile Communication Device And Method For Incoming-Call Filtering," filed on Apr. 22, 2005, which is incorporated herein by reference and assigned to the assignee hereof

FIELD OF INVENTION

The present invention generally relates to a mobile communication device, a mobile communication system, and a method for incoming-call processing (e.g. filtering).

BACKGROUND OF THE INVENTION

The local area communication devices (e.g., home cordless phones) are typically provided through local area communication system (e.g., Digital Enhanced Cordless Telecommunications (DECT) and Internet Protocol (IP)) for users to dial or receive phone calls by wireless manners in specific areas (e.g. home area or office area). This kind of local area communication device results in distinct communication quality but within a limited area. By contrast, the wide area communication devices (e.g., mobile communication devices) can be used in much wider areas through wide area communication system (e.g., GSM/GPRS and CDMA). However, such devices cost more and are disturbed easily during signals communication.

Due to the reasons above, the conventional technologies in the U.S. Pat. Nos. 5,463,674, 6,484,027, and 6,140,560 disclosed a dual-mode mobile communication device.

The dual-mode mobile communication device, which integrates the local area communication device and wide area communication device, may receive and transmit signals through the local area cordless communication network in specific areas and through the wide area cellular communication network in the areas outside of specific areas. However, the dual-mode mobile communication device is relatively power consumptive, so that batteries replacement or charging is required frequently causing inconvenience.

Besides, the mobile communication devices of the conventional technologies referred to above are incapable of filtering the incoming calls. Thus, the users of the mobile communication device are disturbed easily by advertising short-messages, product promotion calls, or other unexpected calls.

Therefore, a mobile communication device, a mobile communication system, and a method for incoming-call filtering are needed.

In addition, it is advantageous to provide a mobile communication device and system for users to communicate through cellular systems (e.g., GSM system) when they are out, and to process (filter) phone calls and forward the selected incoming calls to the phone numbers of home cordless system by call forwarding settings when they come home.

Moreover, it is advantageous to provide a mobile communication device and system for users to dial or receive phone calls by different communication technologies at different time periods.

SUMMARY OF THE INVENTION

One aspect of the present invention is to provide a mobile communication device and a communication system for users, who are in the range of local area communication areas, to receive the incoming calls coming through wide area communication system by a local area communication network.

Another aspect of the present invention is to provide a method of processing (filtering) incoming calls for users to process (filter) the incoming calls coming through wide area communication system according to the phone number groups pre-set up by users, and to perform distinctive response functions according to incoming calls of different phone number groups. The response functions include the call forwarding.

A mobile communication system of the present invention includes a wide area communication network, a local area communication network, a mobile communication device, and a server, wherein the mobile communication device comprises a wide area communication module communicating with the wide area communication network and a local area communication module communicating with the local area communication network, and the wide area communication module and the local area communication module are selectively enabled. The server comprises a database which includes a plurality of data groups and at least one response function. The mobile communication device sends a signal to the server when the local area communication module is enabled. When the server receives an incoming call through the wide area communication network asking for communication with the mobile communication device, the server compares the incoming information of the incoming call with the plurality of data groups and then performs the at least one response function based on the result of comparison. At this time the mobile communication device may disable the wide area communication module to save the power of the device.

The present invention provides a method for incoming-call filtering, which comprises (a) enabling the local area communication module; (b) the mobile communication device sending a signal to the server to activate the function of incoming-call filtering; (c) when the server receives an incoming call through a wide area communication network asking for communication with the mobile communication device, the server comparing the incoming information of the incoming call with said plurality of data groups; (d) producing a result of comparison; and (e) performing the at least one response function according to the result of comparison.

The present invention may allow users to process voice communication by a mobile communication device through communication systems (e.g., GSM system) when they are out of the local communication area, and to process (filter) phone calls and forward the selected incoming calls to the phone numbers of home cordless system by call forwarding settings when they are home.

The present invention may allow users to dial or receive incoming calls by different communication technologies at different time periods.

In addition, the present invention may allow users to filter and forward incoming calls according to the locations the communication device resides at, through the settings of contact groups or forwarding functions. Furthermore, users may give either one of the numbers of mobile phone or household cordless phone to specific people, and keep privacy of another one while keeping the communication enabled all the time.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

Figure 1:
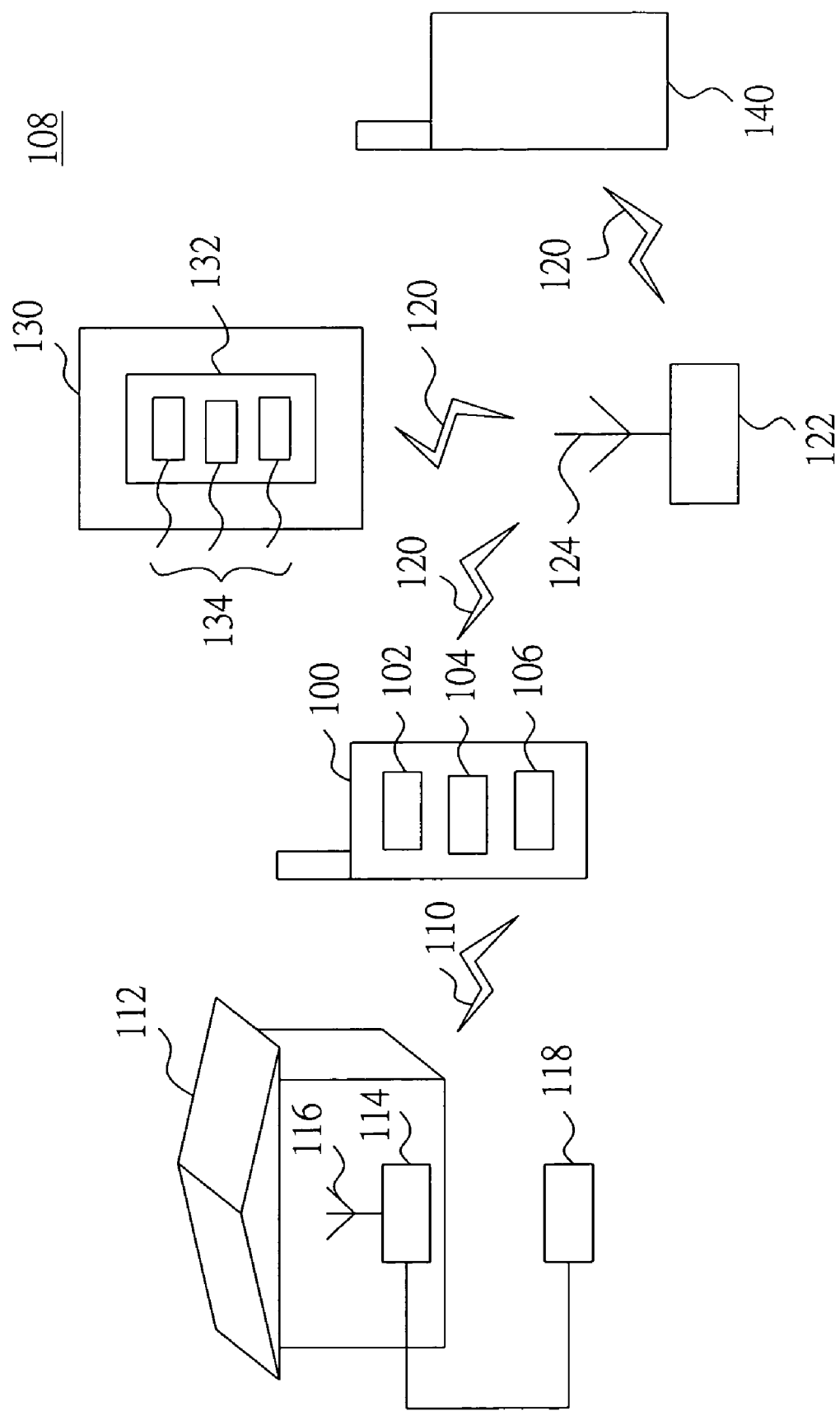
FIG. 1 illustrates a mobile communication device and a communication system configuration of an embodiment of the present invention.

FIG. 1 illustrates a communication system 108 of an embodiment of the present invention, including a mobile communication device 100, a local area communication network 110, a wide area communication network 120, and a server 130. The local area communication network 110 which can only operate within local area range enables the mobile communication device 100 to communicate with TELCO (telephone company phone system) 118 through the antenna 116 of cordless base station 114 in the specific area 112 (e.g., the areas nearby residences or offices). The cordless base station 114 is connected to TELCO 118 by telephone line or cable. The cordless base station 114 may communicate with the mobile communication device 100 through local area communication network 110 by employing the technology of VoIP. The mobile communication device 100 receives or transmits signals through the server 130 and the antenna 124 of cellular base station 122 in the areas other than the specific area 112. The local area communication network 110 includes, but is not limited to, DECT and VoIP, and the wide area communication network 120 includes, but is not limited to, GSM/GPRS, 3G, and CDMA. The server 130 is used for executing all conventional functions and the additional functions which are described hereinafter.

The mobile communication device 100 is a dual mode mobile communication device, including a local area communication module 102 and a wide area communication module 104. In accordance with an embodiment, the local area communication module 102 is in charge of processing all telephone functions of fixed network communications. The wide area communication module 104 is in charge of processing all telephone functions of the mobile communication network. Moreover, the local area communication module 102 communicates with the cordless base station 114, and the wide area communication module 104 communicates with the cellular base station 122. In accordance with another embodiment, the mobile communication device 100 optionally includes a switch 106 for switching between two modules, and the local area communication module 102 and the wide area communication module 104 are selectively enabled by the switching function. When the local area communication module 102 is enabled, the wide area communication module 104 is disabled. In another embodiment, the mobile communication device 100 will switch to the local area communication module 102 automatically when the specific area 112 of the local area communication network 110 is detected. The mobile communication device 100 will enable the wide area communication module 104 automatically to execute the wide area communications when leaving the specific area 112, and at this time the mobile communication device 100 disables the local area communication module 102 to save the power consumption of the device.

A database 132 is provided in the server 130, and the database 132 includes a plurality of data groups 134 and at least one response function. In an embodiment, the data groups 134 are a plurality of phone number groups. The users of the mobile communication device 100 may group the phone numbers of incoming calls corresponding to the communication network of the mobile communication device 100 into different phone number groups (e.g., colleague group, relative and friend group, or client group) by modifying the information of database 132 in the server 130 through the WAP (Wireless Application Protocol) browser, Internet, or other methods. When the server 130 receives an incoming call 140 through the wide area communication network 120 asking for communication with the wide area communication module 104, the server 130 selectively performs the response function based on the user's group of incoming-call 140 and the corresponding response method. The details are described below.

Figure 2:
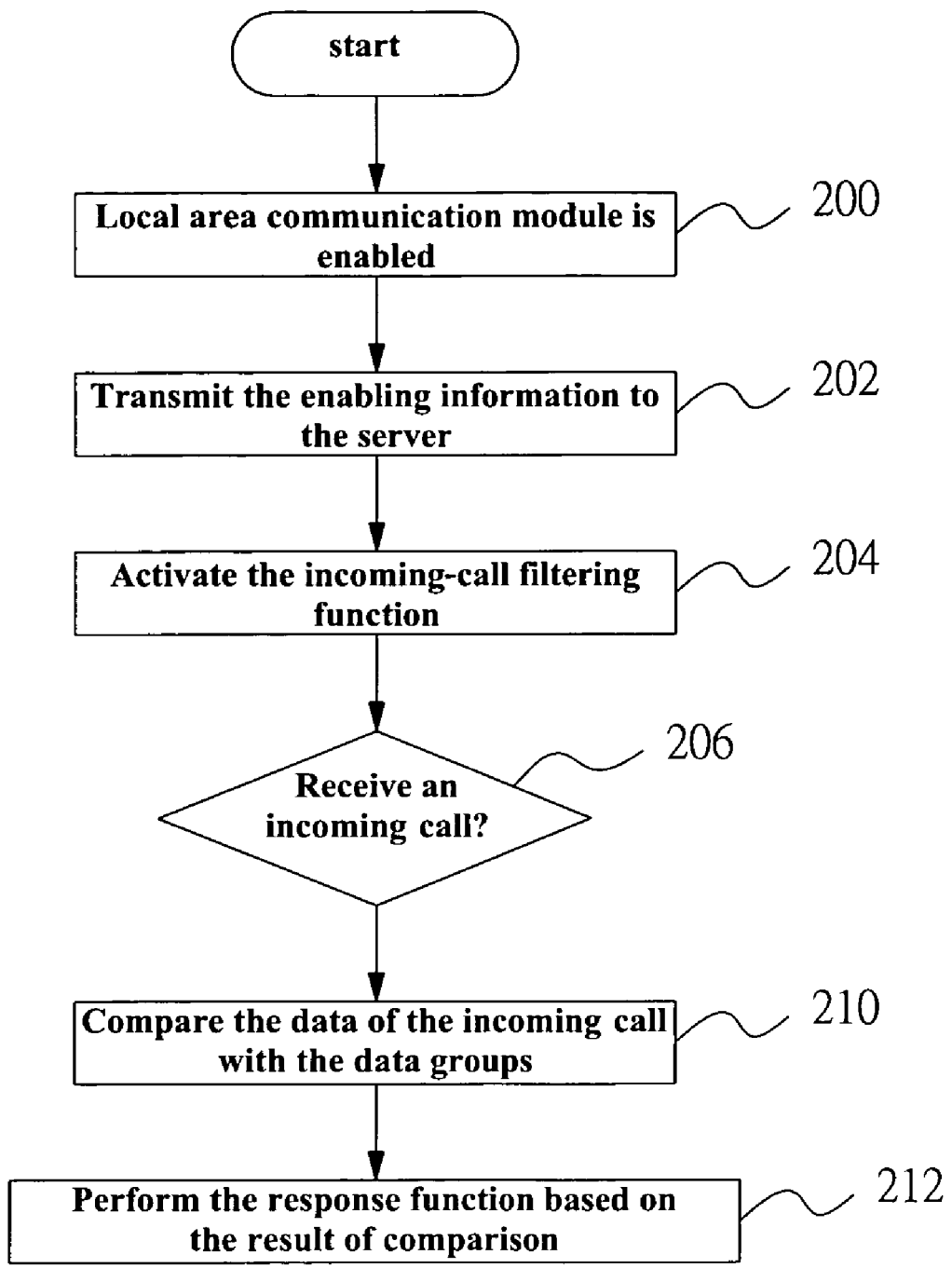
FIG. 2 illustrates a flow diagram of the process of the incoming call of the present invention.

With reference to FIGS. 1, 2, and 3A-3D for the best understanding of the system and method of the present invention, FIG. 2 illustrates a flow diagram of the process of the incoming call of the present invention, and FIGS. 3A-3D illustrate flow diagrams of the embodiments of responses to the incoming calls of different groups. First, after the local area communication module 102 is enabled automatically or manually (Block 200), the mobile communication device 100 transmits the information of the local area communication module 102 being enabled to the server 130 (Block 202), and then the server 130 activates the predetermined incoming call filtering function (Block 204). Next, the server 130 determines whether an incoming call through the wide area communication network 120 from a caller 140 who dials the phone numbers of communication network is received (Block 206). The server 130 then compares the data of the incoming call (e.g., number of the incoming call) with the data groups 134 (e.g., phone number groups) and then performs the response function based on the result of comparison (Block 212). For example, users may classify the phone number groups of relative and friend, colleague, and client as group A, group B, and group C. And comparison result of the incoming-call numbers of caller 140 with the data of phone number groups 134, may either belong to group A or may belong to none of data groups. Embodiments of the result of comparison and response methods are described respectively in FIGS. 3A, 3B, 3C, and 3D.

Figure 3A:
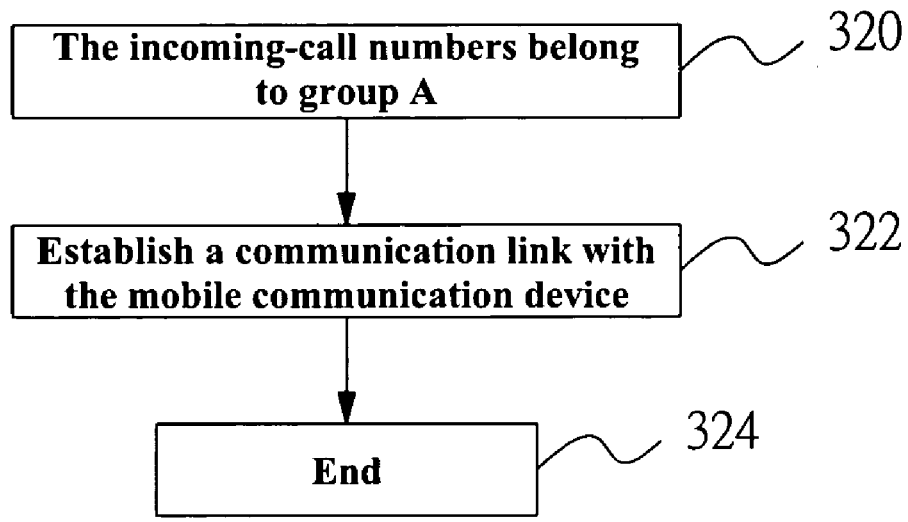
FIG. 3A-3D illustrate flow diagrams of the embodiments of responses to the incoming calls of different groups.

With reference to FIG. 3A, when the incoming-call phone number belongs to group A (Block 320), the response function in Block 322 that establishes a communication link with the mobile communication device 100 is performed. When an incoming call through wide area communication network 120 asks for communication with the wide area communication module 104 of a phone number, the "call forwarding" function is performed such that the incoming call is transmitted to the local area communication module 102 through local area communication network 110 to establish a communication link with the mobile communication device 100.

Figure 3B:
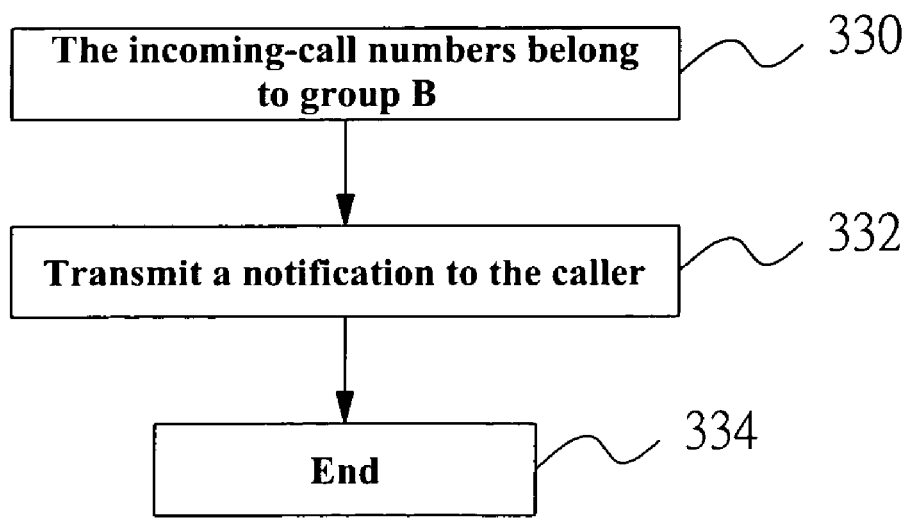

With reference to FIG. 3B, when the incoming-call phone numbers belong to group B (Block 330), the response function in Block 332 is performed such that the server 130 transmits a notification to the caller 140. For example, the response function notifies the caller 140 that the mobile communication device 100 is off-line status or busy line status.

Figure 3C:
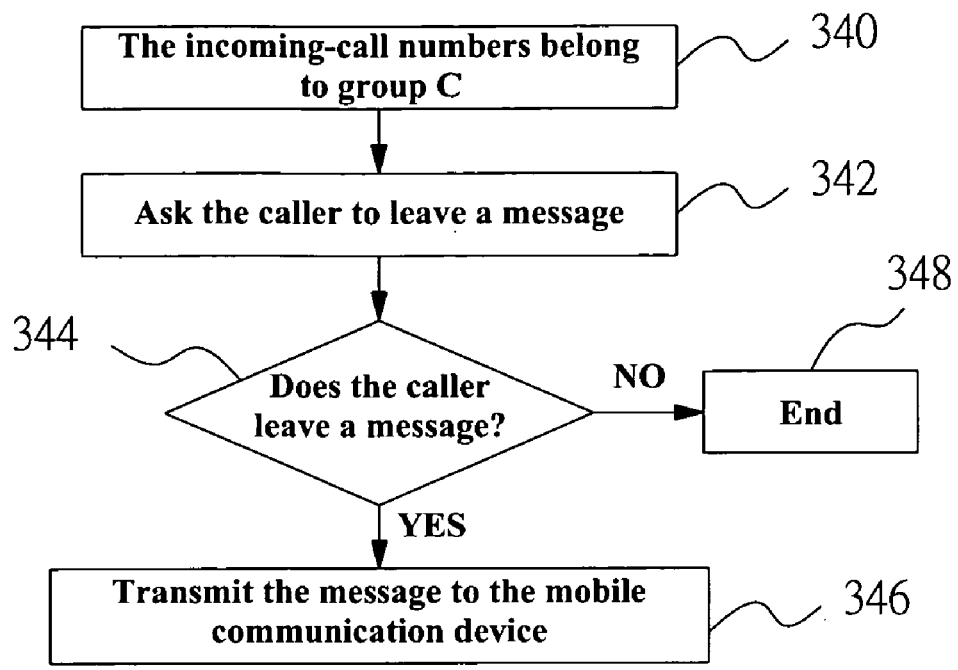

With reference to FIG. 3C, when the incoming-call phone numbers belong to group C (Block 340), the response function in Block 342 is performed such that the server 130 asks the caller 140 to leave a message. Users may set up predetermined voice signals to be transmitted to the callers 140 who belong to group C. The predetermined voice signals may notify the caller 140 to leave a message or call back at another day. Next, if the caller 140 leaves a message (Block 344), the server 130 will transmit the message to the mobile communication device 100 through local area communication network 110 (Block 346). Or in another embodiment, the server 130 transmits the incoming-call signals to the mobile communication device 100 after the wide area communication module 104 is enabled. If the caller 140 does not leave a message (Block 344), the call forwarding function is disabled and the communication link with the caller 140 is terminated (Block 348).

Figure 3D:
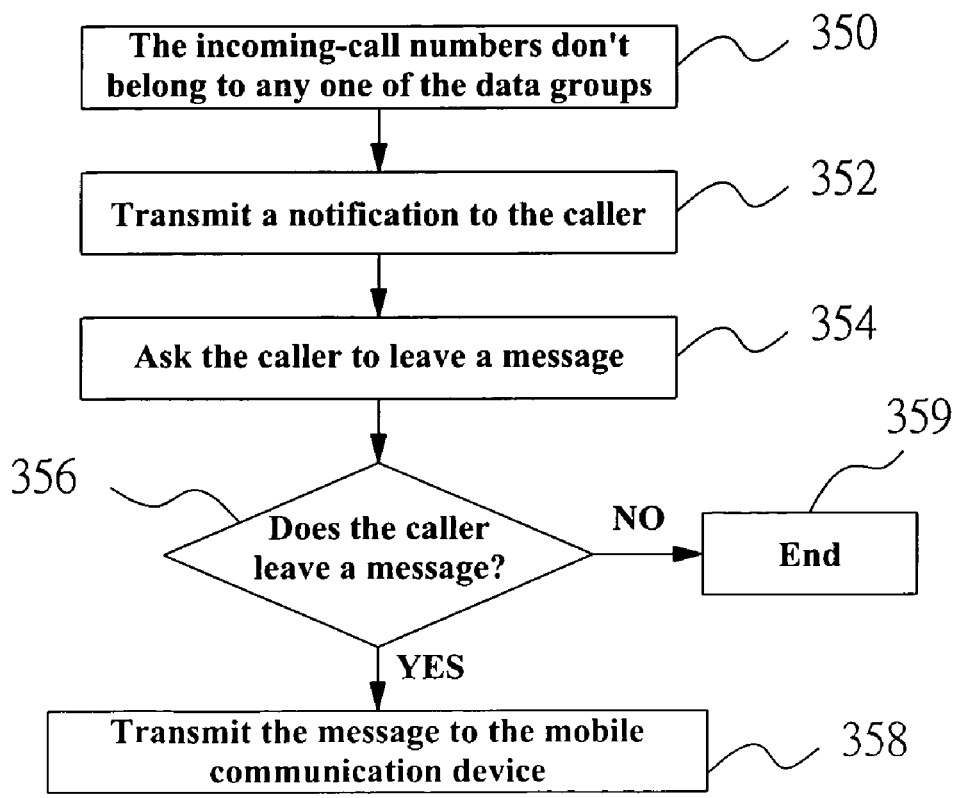

With reference to FIG. 3D, when the incoming-call phone numbers don't belong to any one of the data groups (Block 350), the response function in Block 352 is performed such that the server 130 transmits information to the caller 140, and asks the caller 140 to leave a message (Block 356). If the caller 140 leaves a message (Block 356), the server 130 will transmit this message to the mobile communication device 100 through the local area communication network 110 (Block 358). Or in another embodiment, the server 130 transmits the incoming-call signals to the mobile communication device 100 after the wide area communication module 104 is enabled. In another embodiment, the steps of Block 352 and Block 354 are omitted, the server 130 refuses the request of the caller 140 to establish a communication link with the mobile communication device 100, and the call forwarding function is disabled and the communication link with the caller 140 is terminated. In addition, in another embodiment, different data groups 134 may correspond to same response function. In other embodiments, the activation of the call forwarding function (Block 204) may be modified or canceled temporarily according to the requests of users of the communication device.

By the detailed description above, it is understood that the present invention provides users the ability to process voice communication by a mobile communication device 100 through communication systems (e.g., GSM system) when they are out, and to process (filter) phone calls and forward the selected incoming calls to the phone number of household cordless phone by enabling the local area communication module 102 and the call forwarding settings when they come home.

The present invention may allow users to dial or receive incoming calls by different communication technologies at different time periods.

The present invention may allow users to filter and forward incoming calls according to the locations the communication device resides at through the settings of contact groups or forwarding functions. Furthermore, users may give either one of the numbers of mobile phone or household cordless phone to specific people, and keep privacy of another one while keeping the communication enabled all the time.

The present invention has been described with reference to different embodiments above; it will be understood by those skilled in the art that the drawings and the detailed description are used to illustrate but not limit the specific formations and embodiments of the invention. On the other hand, various modifications may be made without departing from said scope of said appended claims.

What is claimed is:
1. A communication system, comprising:
a wide area communication network;
a local area communication network;
a mobile communication device, comprising a wide area communication module for communicating with said wide area communication network and a local area communication module for communicating with said local area communication network, said wide area communication module and said local area communication module being selectively enabled; and
a server, having a database including a plurality of data groups and at least one response function, said mobile communication device sending a signal to said server when said local area communication module is enabled;
wherein when said server receives an incoming call through said wide area communication network asking for communication with said mobile communication device, said server compares a data of said incoming call with said plurality of data groups and then performs said at least one response function according to the result of comparison,
wherein said at least one response function includes asking a caller corresponding to said incoming call to leave a message as said data does not belong to one of said plurality of data groups.

2. The communication system of claim 1, wherein said at least one response function includes refusing establishing a communication link between said incoming call and said mobile communication device as said data does not belong to any of said plurality of data groups.

3. The communication system of claim 1, wherein said at least one response function includes playing a default voice signal.

4. The communication system of claim 1, wherein said at least one response function includes sending a message to said mobile communication device through said local area communication module.

5. The communication system of claim 1, wherein said at least one response function includes forwarding said incoming call to said mobile communication device through said local area communication network as said data matches one of said plurality of data groups.

6. The communication system of claim 1, wherein said local area communication network defines a local area communication range, said mobile communication device enables said local area communication module automatically as said mobile communication device is detected as being within said local area communication range.

7. The communication system of claim 6, wherein said mobile communication device disables said wide area communication module after enabling said local area communication module.

8. A method, applicable in a communication system, for processing an incoming call, said communication system includes a wide area communication network, a local area communication network, a server, and a mobile communication device, said server comprises a database including a plurality of data groups and at least one response function, said mobile communication device comprises a wide area communication module communicating with said wide area communication network and a local area communication module communicating with said local area communication network, said wide area communication module and said local area communication module being selectively enabled, including:
(a) enabling said local area communication module;
(b) said mobile communication device sending a signal to said server to activate a predetermined incoming- call processing function;

(c) when said server receives an incoming call through a wide area communication network asking for communication with said mobile communication device, said server comparing a data of said incoming call with said plurality of data groups;

producing a result of comparison; and performing said at least one response function according to the result of comparison, wherein said at least one response function includes asking a caller corresponding to said incoming call to leave a message as said data does not belong to one of said plurality of data groups.

9. The method of claim 8, wherein said at least one response function includes refusing establishing a communication link between said incoming call and said mobile communication device as said data does not belong to one of said plurality of data groups.

10. The method of claim 8, wherein said at least one response function includes forwarding said incoming call to said mobile communication device through said local area communication network as said data matches one of said plurality of data groups.

11. The method of claim 8, wherein said local area communication network defines a local area communication range, said mobile communication device enables said local area communication module automatically as said mobile communication device is detected as being within said local area communication range.

12. The method of claim 11, wherein said mobile communication device disables said wide area communication module after enabling said local area communication module.

13. A mobile communication device operated in a communication system, said communication system including a wide area communication network, a local area communication network, and a server, said server comprising a database including a plurality of data groups and at least one response function, comprising:

a wide area communication module for communicating with said wide area communication network; and a local area communication module for communicating with said local area communication network, said wide area communication module and said local area communication module being selectively enabled;

wherein, said mobile communication device sends a signal to said server to activate a predetermined incoming call processing function as said local area communication module is enabled, wherein said at least one response function includes asking a caller corresponding to an incoming call to leave a message as a data of said incoming call does not belong to one of said plurality of data groups.

14. The mobile communication device of claim 13, wherein said at least one response function includes refusing establishing a communication link between said incoming call and said mobile communication device as said data does not belong to one of said plurality of data groups.

15. The mobile communication device of claim 13, wherein said local area communication network defines a local area communication range, said mobile communication device enables said local area communication module when entering said local area communication range.

16. The mobile communication device of claim 15, wherein said mobile communication device disables said wide area communication module after enabling said local area communication module.

17. The mobile communication device of claim 16, wherein said mobile communication device disables said local area communication module and enables said wide area communication module when leaving said local area communication range.

18. The communication system of claim 1, wherein said local area communication network defines a local area communication range, said mobile communication device receives/transmits a plurality of signals through the server and a cellular base station of said wide area communication network in areas other than said local area communication range.

19. The method of claim 8, wherein said local area communication network defines a local area communication range, said mobile communication device receives/transmits a plurality of signals through the server and a cellular base station of said wide area communication network in areas other than said local area communication range.

20. The mobile communication device of claim 13, wherein said local area communication network defines a local area communication range, said mobile communication device receives/transmits a plurality of signals through the server and a cellular base station of said wide area communication network in areas other than said local area communication range.

* * * * *

UNITED STATES PATENT AND TRADEMARK OFFICE
CERTIFICATE OF CORRECTION

PATENT NO. : 7,627,308 B2 Page 1 of 1
APPLICATION NO. : 11/409859
DATED : December 1, 2009
INVENTOR(S) : Chang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 721 days.

Signed and Sealed this

Twenty-first Day of December, 2010

David J. Kappos
*Director of the United States Patent and Trademark Office*